United States Patent
Lyman

(10) Patent No.: US 9,311,795 B2
(45) Date of Patent: Apr. 12, 2016

(54) SYSTEMS AND METHODS FOR OPERATING REMOTE PRESENCE SECURITY

(71) Applicant: Vivint, Inc., Provo, UT (US)

(72) Inventor: Jefferson Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 36 days.

(21) Appl. No.: 14/264,709

(22) Filed: Apr. 29, 2014

(65) Prior Publication Data

US 2015/0310712 A1 Oct. 29, 2015

(51) Int. Cl.
*H04N 7/14* (2006.01)
*G08B 13/196* (2006.01)
*H04N 7/18* (2006.01)

(52) U.S. Cl.
CPC .......... *G08B 13/19695* (2013.01); *H04N 7/141* (2013.01); *H04N 7/181* (2013.01)

(58) Field of Classification Search
CPC ..... H04M 11/025; H04N 7/142; H04N 7/147; H04N 7/186; H04N 7/20
USPC .......... 379/102.06, 102.01; 348/14.01, 14.03, 348/14.05, 14.06
See application file for complete search history.

(56) References Cited

U.S. PATENT DOCUMENTS

| 8,780,201 | B1 * | 7/2014 | Scalisi et al. | 348/143 |
| 2005/0270143 | A1 * | 12/2005 | Wang | 340/286.06 |
| 2012/0262581 | A1 * | 10/2012 | Carter | 348/152 |
| 2014/0266669 | A1 * | 9/2014 | Fadell et al. | 340/501 |

* cited by examiner

*Primary Examiner* — Melur Ramakrishnaiah
(74) *Attorney, Agent, or Firm* — Holland & Hart LLP

(57) ABSTRACT

A computer-implemented method for remote presence security is described. In one embodiment, an event is detected in relation to a premises. Upon detecting the event, a location of an occupant of the premises is determined in relation to the premises. Upon determining the occupant is a predetermined distance away from the premises, a first type of notification is sent. The first type of notification includes a display of real-time video being captured at the premises.

18 Claims, 6 Drawing Sheets

SYSTEMS AND METHODS FOR OPERATING REMOTE PRESENCE SECURITY

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and home security products. Advancements in mobile devices allow users to monitor a home or business. As a result, benefits may be realized by providing systems and methods for remote presence security in relation to home automation systems.

SUMMARY

According to at least one embodiment, a computer-implemented method for operating remote presence security is described. In one embodiment, an event may be detected in relation to a premises. Upon detecting the event, a location of an occupant of the premises may be determined in relation to the premises. Upon determining the occupant is a predetermined distance away from the premises, a first type of notification may be sent. The first type of notification may include a display of real-time video being captured at the premises. In some embodiments, the first type of notification may include an option to enable real-time two-way audio communication between a mobile device of the occupant and a device at the premises and/or real-time one-way audio from a device at the premises to a mobile device of the occupant. In some cases, upon detecting the event, pre-recorded data may be communicated to a device associated with an entrance of the premises.

In some embodiments, upon determining the occupant is within a predetermined distance of the premises, a second type of notification may be sent to the mobile device. The second type of notification may include one or more options to enable the occupant to select how to respond to the event. The one or more options may include an option to send the real-time video being captured at the premises to a dedicated television channel accessed via a media delivery device, an option to respond to the event using a control panel at the premises, an option to respond to the event using a device on which the second type of notification was received, an option to notify emergency personnel regarding the event, and/or an option to disregard the event, among other possible options.

A computing device configured for operating remote presence security is also described. The device may include a processor and memory in electronic communication with the processor. The memory may store instructions that may be executable by the processor to detect an event in relation to a premises, upon detecting the event, determine a location of an occupant of the premises in relation to the premises, and upon determining the occupant is a predetermined distance away from the premises, sending a first type of notification. The first type of notification may include a display of real-time video being captured at the premises.

A computer-program product for operating remote presence security is also described. The computer-program product may include a non-transitory computer-readable medium that stores instructions. The instructions may be executable by the processor to detect an event in relation to a premises, upon detecting the event, determine a location of an occupant of the premises in relation to the premises, and upon determining the occupant is a predetermined distance away from the premises, sending a first type of notification. The first type of notification may include a display of real-time video being captured at the premises.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
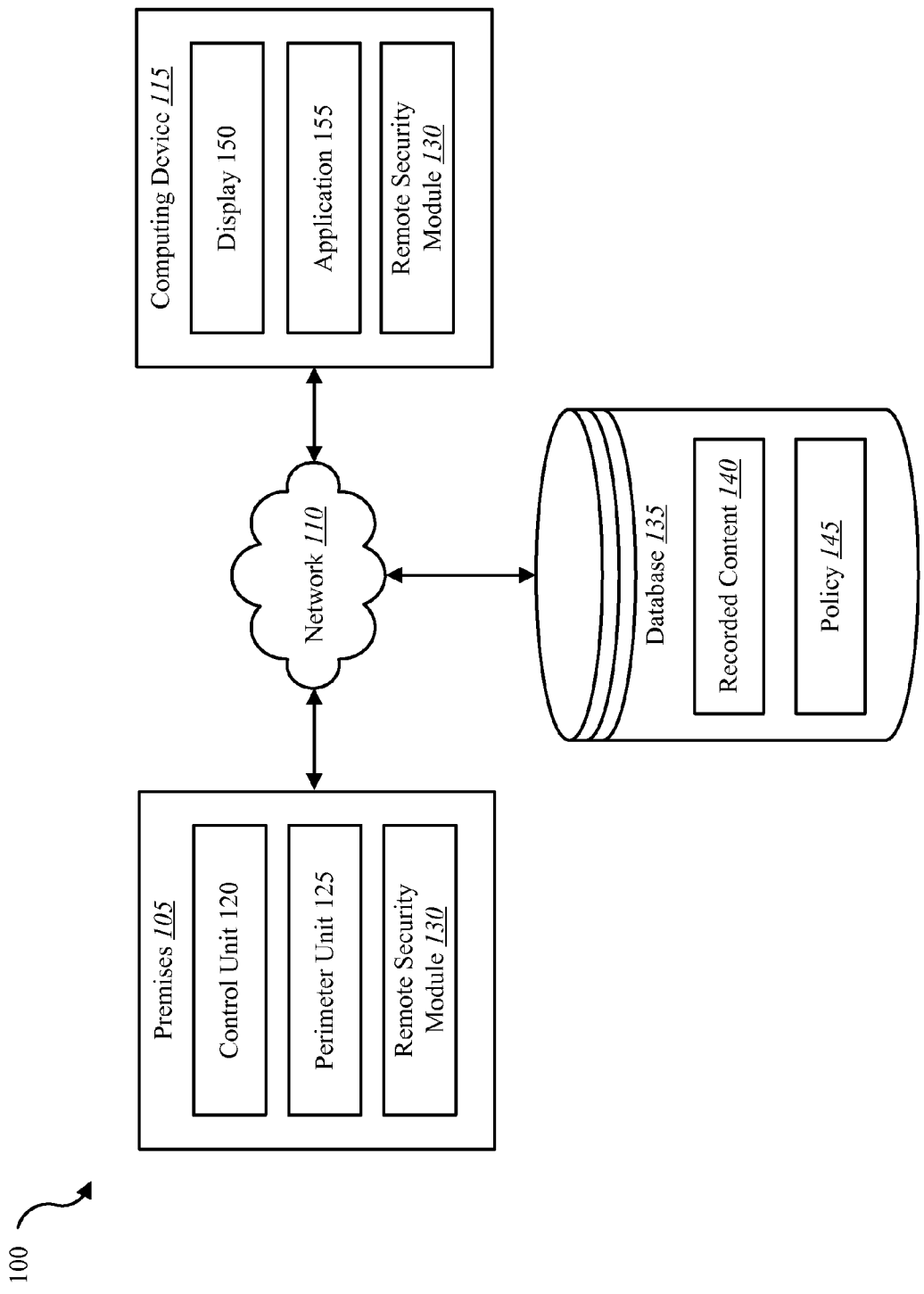
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to home automation. More specifically, the systems and methods described herein relate to remote presence security in relation to a home automation system. Some embodiments of the systems and methods described herein relate to remote presence security in relation to an integration of home automation and a subscriber-based media content set top box, such as a satellite and/or cable digital video recorder (DVR).

In one example, a user may desire to receive an alert when someone enters a predefined area. For instance, a user may want to know when a person comes to a door of a certain premises (e.g., user's house, work place, storage space etc.). The present systems and methods may detect when a person approaches the premises and provide a notification message upon detecting the person at or near the premises. For example, the systems and methods described herein may capture an image of a person that approaches an entrance and/or presses a doorbell button. The captured image may be relayed to one or more devices where a user is able to view the captured image. For example, the image may be sent to one or more computing devices (e.g., desktop computer, laptop computer, mobile computing device, smart phone, etc.), to a screen of a wall-mounted control unit (e.g., home automation control unit and/or premises security control unit), and/or other viewing devices such as a television and the like.

Moreover, the systems and methods described herein may provide remote presence security to allow a user to interact remotely with a person at the premises. For example, the user may have a home in a particular city in a certain country. The user may leave his or her home for a time. For instance, the user may travel to another city on a business trip, on a vacation, etc. In some cases, the user may leave the premises to go to work, to go grocery shopping, etc. In some cases, the user may visit the premises occasionally (e.g., vacation home, storage unit, etc.). Accordingly, when the systems and methods detect the presence of a person at or within a predetermined distance from the premises, the user may receive a notification. In addition to sending a notification the systems and methods may enable the user to interact remotely with a person at the premises. To the person at the premises the user appears to be present at the premises. For example, the user interface may enable the user to receive images captured at the premises and/or send images to the premises (e.g., video images, photograph images, real-time video, etc.). Additionally, or alternatively, the user interface may allow the user to receive audio captured at the premises (e.g., audio of the person speaking into a microphone at the premises relayed to a speaker on a device of the user) and/or send audio to the premises (i.e., audio of the user relayed to a speaker at the premises). Thus, a person at the premises may be convinced that the user is at the premises. Accordingly, among other benefits, the systems and methods described herein may provide a form of theft deterrence to would be burglars, thieves, etc.

FIG. 1 is a block diagram illustrating one embodiment of an environment 100 in which the present systems and methods may be implemented. In some embodiments, the systems and methods described herein may be performed in relation to on one or more devices illustrated in environment 100. The environment 100 may include a control unit 120 and a perimeter unit 125, either of which may be located at a premises 105. Environment 100 may also include a computing device 115, a network 110, and a database 135. Computing device 115 may include a display 150 and application 155. In some cases, premises 105 and/or computing device 115 may include a remote security module 130. Examples of computing device 115 may include a media content set top box, satellite set top box, cable set top box, DVR, personal video recorders (PVRs), mobile devices, smart phones, personal computing devices, computers, servers, etc. Examples of the control unit 120 include a dedicated home automation computing device (e.g., wall-mounted controller), a personal computing device (e.g., laptop, desktop, etc.), a mobile computing device (e.g., tablet computing device, smartphone, etc.), and the like.

Network 110 may enable perimeter unit 125, control unit 120, computing device 115, and database 135 to communicate with one another. Examples of networks (e.g., network 110) include cloud networks, local area networks (LAN), wide area networks (WAN), virtual private networks (VPN), wireless networks (using 802.11, for example), voice and/or data cellular networks (using 3G and/or LTE, for example), etc. In some configurations, the network 110 may include the internet.

In some embodiments, one or more devices illustrated in environment 100 may be coupled to database 135. Database 135 may include recorded content 140 and a user policy 145. Recorded content 140 may include one or more captured images and/or recorded audio. For example, recorded content 140 may include recorded audio and/or video of an occupant of premises 105. Control unit 120, perimeter unit 125, remote security module 130, and/or computing device 115 may access the recorded content 140 in database 135 via network 110. In some embodiments, database 135 may be internal or external to one or more devices of environment 100 al (e.g., connected to a device through network 110 and/or connected directly to one or more devices of environment 100). For example, at least a portion of database 135 may be internal or external to perimeter unit 125, control unit 120, and/or computing device 115.

In some embodiments, computing device 115 may not include a remote security module 130. In some cases, computing device 115 may access one or more functions of remote security module 130 via application 155. For example, application 155 may be installed on computing device 115 in order to allow a user to interface with a function of perimeter unit 125, remote security module 130, and/or control unit 120 associated with premises 105. In some cases, application 155 may be installed and executed on computing device 115, control unit 120, and/or perimeter unit 125. Application 155 may enable control unit 120, perimeter unit 125, and/or computing device 115 to access a function of remote security module 130 through a network connection via network 110. For example, with application 155 located and installed on control unit 120, control unit 120 may execute application 155 to access remote security module 130 on computing device 115 and enable a function of remote security module 130 on computing device 115. In some cases, computing device 115, control unit 120, and/or perimeter unit 125 may access a server connected to network 110, where the server includes remote security module 130.

Figure 2:
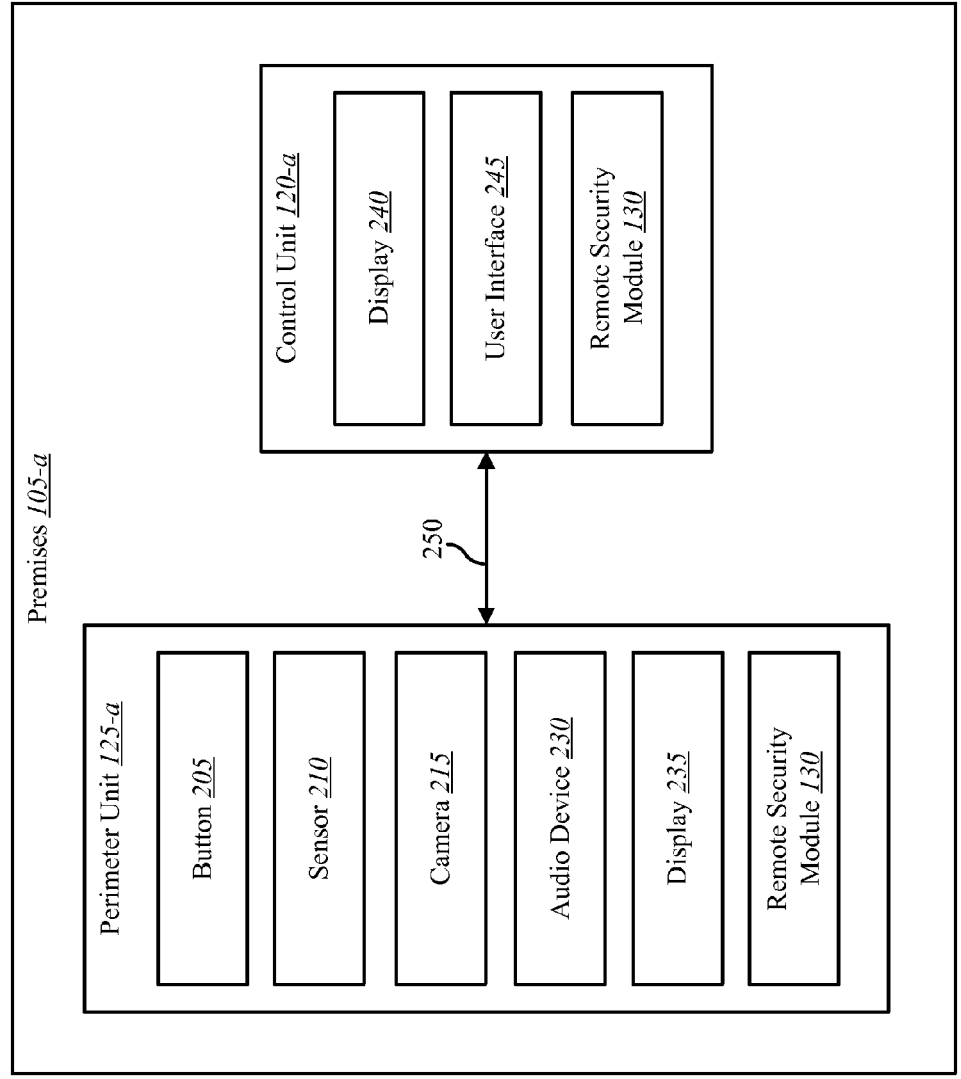
FIG. 2 is a block diagram illustrating one embodiment of an environment in which the present systems and methods may be implemented.

FIG. 2 is a block diagram illustrating an embodiment of an environment 200 in which the present systems and methods may be implemented. In some embodiments, the systems and methods described herein may be performed in relation to on one or more devices illustrated in environment 200. The environment 200 may include premises 105-*a*, perimeter unit 125-*a*, control unit 120-*a*, and connection 250. Premises 105-*a*, perimeter unit 125-*a*, and control unit 120-*a* may be examples of premises 105, perimeter unit 125, and control unit 120 from FIG. 1, respectively. Perimeter unit 125-*a* and control unit 120-*a* may communicate via connection 250. Connection 250 may include one or more wired and/or wireless connections. Network 110 may include connection 250. Thus, network 110 and/or connection 250 may include any combination of wired data connections, wireless data connections, cellular data connections, the Internet, and so forth. Although certain elements depicted in environment 100 are not illustrated in environment 200, it is understood that one or more of those elements may be part of environment 200. In some cases, perimeter unit 125-*a* may be located at a location external to premises 105. For example, perimeter unit 125-*a* may be located on an external wall near an entrance of premises 105-*a*, while control unit 120-*a* may be mounted on an interior wall of premises 105-*a*. In some cases, perimeter unit 125-*a* may be located near a gate associated with premises 105-*a*. For example, premises 105-*a* may be located behind a gate of a gated community, a gate of a storage unit, a gate of a single dwelling, etc. In some cases, a premises may include two or more perimeter units. Accordingly, one perimeter unit may be located at a gate, another perimeter unit may be located at an entrance of the premises, etc.

In some configurations, the control unit 120 may include a display 240, a user interface 245, and remote security module 130. Although the components of control unit 120-*a* and perimeter unit 125-*a* are depicted as being internal to each unit, it is understood that one or more of the components may be external and connect to either unit, respectively, through wired and/or wireless connections (e.g., connection 250). Perimeter unit 125 may include a button 205, a sensor 210, a camera 215, an audio device 230, a display 235, and remote security module 130. Examples of sensor 210 include a camera sensor, audio sensor, proximity sensor, motion sensor, accelerometer, capacitance sensor, radio frequency sensor, near-field sensor, voice sensor, and the like. Sensor 210 may represent one or more separate sensors or a combination of two or more sensors in a single device. For example, sensor 210 may represent one or more camera sensors and one or more motion sensors. Sensor 210 may be integrated with a facial recognition system. Audio device 230 may include one or more microphones and/or one or more speakers.

Camera 215 may capture an image in relation to an event detected at premises 105-*a*. Camera 215 may capture photographic images and/or video images. In some cases, sensor 210 may detect the presence of a person at an entry of premises 105-*a*. Camera 215 may be positioned to view a certain area associated with premises 105-*a* (e.g., a view of an entrance of premises 105-*a*, a view within premises 105-*a*, etc.). Thus, upon detecting the presence of a person at an entrance of premises 105-*a*, camera 215, positioned near the entrance, may be triggered to capture an image of a view of the entrance. In some cases, camera 215 may be triggered to capture an image upon a person pressing button 205.

In some embodiments, perimeter unit 125-*a* may communicate with control unit 120-*a* via connection 250. In some cases, premises 105 may include a wired and/or wireless network (e.g., network 110) to enable communication between devices at the premises, such as communications between control panel 120-*a* and perimeter unit 125-*a*, for example. It is noted that in some embodiments, the perimeter unit 125-*a* may not include a remote security module 130. In some embodiments, perimeter unit 125-*a* and control unit 120-*a* may include remote security module 130, where at least a portion of the functions of remote security module 130 are performed separately and/or concurrently on perimeter unit 125-*a* and/or control unit 120-*a*. Likewise, in some embodiments, a user may access one or more functions of perimeter unit 125-*a* and/or control unit 120-*a* from computing device 115. For example, in some embodiments, computing device 115 includes a mobile application that interfaces with one or more functions of perimeter unit 125-*a* and/or control unit 120-*a*.

Via remote security module 130, an occupant of premises 105-*a* and a person outside of premises 105-*a* may communicate using the depicted units 120-*a* and 125-*a*. For example, occupant may use control unit 120-*a* to communicate with the person outside of premises 105-*a* and the person outside of premises 105-*a* may use perimeter unit 125-*a* to communicate with the occupant. Audio may be communicated to the person via audio device 230, and video may be communicated to the person via display 235. Likewise, audio and video may be communicated to the occupant via display 240 and a speaker of control unit 120-*a* and/or one or more speakers located within premises 105-*a*. In some cases, the occupant may use computing device 115 to communicate with the person that is outside of premises 105-*a*. For example, occupant may be outside the premises 105-*a* (e.g., in the backyard of premises 105-*a*, at a grocery store, in a city or country different than that of premises 105-*a*, etc.) when the person comes to the door of premises 105-*a*. The computing device 115 carried by the occupant may receive a notification as a result of the perimeter unit 125-*a* detecting the person in relation to the premises 105-*a*. For example, computing device 115 may vibrate, play a sound, and/or display an image as part of the notification. Using computing device 115, the occupant may respond to the notification by communicating with the person as if they were inside the premises 105-*a*. In one example, the person at the door may be a delivery person. The occupant may tell the delivery person that they cannot come to the door, but to leave the package on the doorstep. In one example, the person at the door may be a solicitor, and the occupant may tell the solicitor that he or she is not interested. In any case, the person at the door communicates with the occupant in real-time where two-way and/or one-way audio are communicated in real-time between the occupant and the person at the premises. Additionally, or alternatively, two-way and/or one-way video are communicated in real-time between the occupant and the person at the premises.

Figure 3:
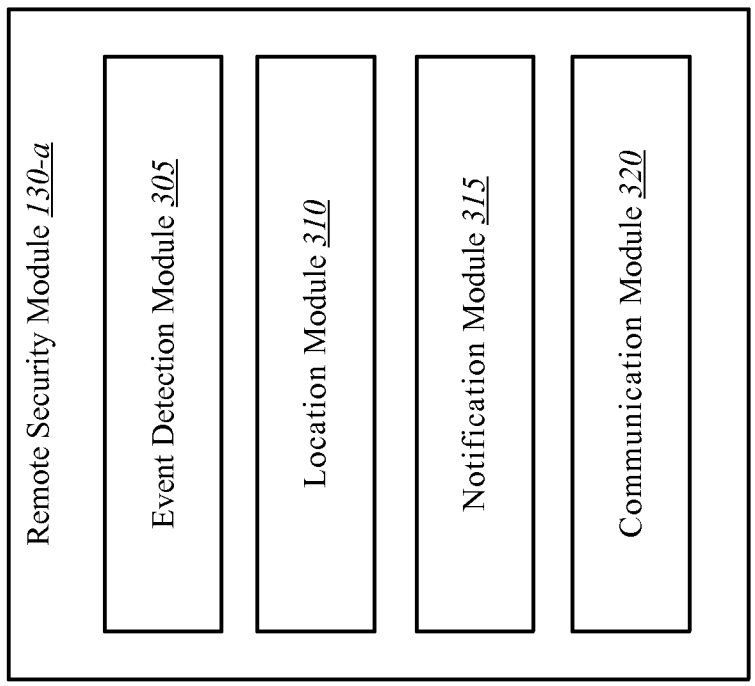
FIG. 3 is a block diagram illustrating one example of a remote security module.

FIG. 3 is a block diagram illustrating one example of a remote security module 130-*a*. Remote security module 130-*a* may be one example of remote security module 130 depicted in FIGS. 1 and/or 2. As depicted, remote security module 130-*a* may include an event detection module 305, a location module 310, a notification module 315, a communication module 320.

In one embodiment, event detection module 305 may detect an event in relation to a premises (e.g., premises 105). In some cases, event detection module 305 may continuously capture, at a predetermined frame rate, images via camera 215. The predetermined frame rate may be determined according to a setting of a user policy (e.g., user policy 145). In one embodiment, event detection module 305 may detect motion via a sensor in the perimeter unit 125 (e.g., via sensor 210). In some cases, event detection module 305 may detect motion inside the premises via a sensor (e.g., wall mounted motion detector, etc.). Upon detecting the motion via a sensor, event detection module 305 may capture one or more images via a camera located at the premises (e.g., camera 215 on perimeter unit 125-*a*, a camera mounted inside the premises, etc.).

In one embodiment, event detection module 305 may detect an event in relation to a premises. For example, event detection module 305 may detect the approach of a person to a certain location, a person pressing on a button, a person knocking on a door, a person in a vehicle pulling up to a gate, and the like. Upon detecting the event, location module 310 may determine a location of an occupant of the premises in relation to the premises. For instance, location module 310 may implement any combination of a global positioning system (GPS), wireless positioning system, indoor positioning system (IPS), BLUETOOTH®, near-field communications (NFC), radio frequency identification (RFID), gyroscope, magnetometer, accelerometer, altimeter, pedometer, etc., to determine a location of an occupant.

Upon determining the occupant is a predetermined distance away from the premises, notification module 315 may send a first type of notification. In some embodiments, notification module 315, in conjunction with the user interface 245, may display a notification on a display connected to control unit 120. In some cases, the first type of notification may include a display of real-time video being captured at the premises. For example, in addition to including an alert (e.g., playing a sound, vibrating the device, and/or flashing a light) the first type of notification may include a live display of real-time video captured at the premises that is displayed on a display of the mobile device of the occupant. Accordingly, in some cases, without having to turn on, unlock, or otherwise access the home screen of the operating system of the mobile device, video captured at the premises may be communicated to and displayed on the mobile device, enabling the occupant to immediately visually assess the detected event. In some cases, the notification may include an option to store at least a portion of video and/or audio captured at the premises. In some cases, the first type of notification may include real-time one-way audio communicated from an audio device at the premises to the mobile device of the occupant. Accordingly, without having to turn on, unlock, or otherwise access the home screen of the operating system of the mobile device, the notification may play audio captured at the premises on one or more speakers on the mobile device of the occupant. Additionally, or alternatively, the first type of notification may include an option to enable real-time two-way audio communication between a mobile device of the occupant and a device at the premises. Accordingly, remote security module 130-a may enable the occupant to communicate with the person in real-time.

In some embodiments, upon detecting the event, communication module 320 may communicate pre-recorded data (e.g., recorded content 140) to a device associated with an entrance of the premises (e.g., communicate to perimeter unit 125). The pre-recorded data may include a recorded message of audio and/or video. In some cases, the pre-recorded message may be played based on a pre-configured policy (e.g., policy 145 configured by occupant, etc.). Examples of recorded messages may include an audio recording of the occupant saying "be right there," "one moment please," "on my way," etc. The communication module 320 may communicate the prerecorded message to a device located relative to an entrance of a premises. In some cases, according to policy, each time an event is detected in relation to the entrance, a prerecorded message may be communicated (e.g., audio played and/or video displayed) relative to the entrance. For example, a speaker located near an entrance of the premises may play a prerecorded audio message. The policy may specify certain times of day when the message is to be communicated. For example, the policy may specify that the message is to be played automatically when an event is detected between 7:00 A.M. and 10:00 P.M., and otherwise, no message is to be communicated. Thus, between certain hours a prerecorded message may be played automatically whenever anyone rings a doorbell, for example, thus affording time for the network to convey a notification to an occupant and for the occupant to respond.

In some embodiments, the notification may display one or more selectable options of prerecorded messages from which the occupant may choose to be played at the premises. For example, if the background (grocery store, beach, etc.) and/or sound profile (busy street, subway, etc.) does not match a home setting, or the occupant is otherwise indisposed to communicate with the person at the entrance in real-time, then the occupant may select among one or more pre-recorded message to be communicated to the premises (e.g., conveyed to doorbell unit 125, etc.). The occupant may record an audio message stating "I'm sorry. I can't come to the door right now." Upon receiving notification that a person is at an entrance of the premises, the user may select a pre-recorded message to be communicated to the person. In some cases, the occupant may view real-time video being captured in relation to an entrance of the premises while the user selects a pre-recorded message to communicate to a device at the entrance. The occupant may receive an acknowledgment that the message was successfully communicated. For example, if the occupant knows that the person at the entrance is a delivery person, the occupant may select an option for a prerecorded message titled "Delivery" that states "I'm sorry. I can't come to the door right now. Just leave the package on the porch. Thanks." The occupant may continue to view the real-time video to verify that the delivery person leaves the package at the entrance. In some cases, the occupant may record a message that includes both audio and video, which may be selected and communicated to the device associated with a location of the premises.

In some embodiments, upon determining the occupant is within a predetermined distance of the premises, notification module 315 may send a second type of notification. The second type of notification may include one or more options to enable the occupant to select how to respond to the event. The one or more options may include an option to send the real-time video being captured at the premises to a dedicated television channel accessed via a media delivery device. In some embodiments, notification module 315 may send a captured image and/or a notification to a set top box. Notification module 315 may display the notification in relation to a presently viewed channel of subscriber program content. In some cases, notification module 315 may display the notification in at least a portion of a viewing area of the channel. For example, a user watching content from a satellite DVR on a television may receive a notification displayed on at least a portion of the screen of the television. In relation to a set-top box service, the notification may include a scrolling message, a picture-in-picture message, and/or switching to a notification or monitoring channel that includes data and/or information in relation to the detected action. A channel dedicated to displaying images captured for remote presence security may be integrated within a channel guide of subscriber program content. Thus, in some cases, images captured in relation to remote presence security may be recorded and stored in a DVR or other similar media storage (e.g., database 135) and/or viewing device.

In some embodiments, the one or more options of the second type of notification may include an option to respond to the event using a control panel at the premises, an option to respond to the event using a device on which the second type of notification was received, an option to notify emergency personnel regarding the event, an option to disregard the event, and so forth. Accordingly, via the described systems and methods, an occupant of a premises may communicate in real-time with a person at the premises, enabling the occupant to appear to be located at the premises whether or not the occupant is not currently located at the premises.

Figure 4:
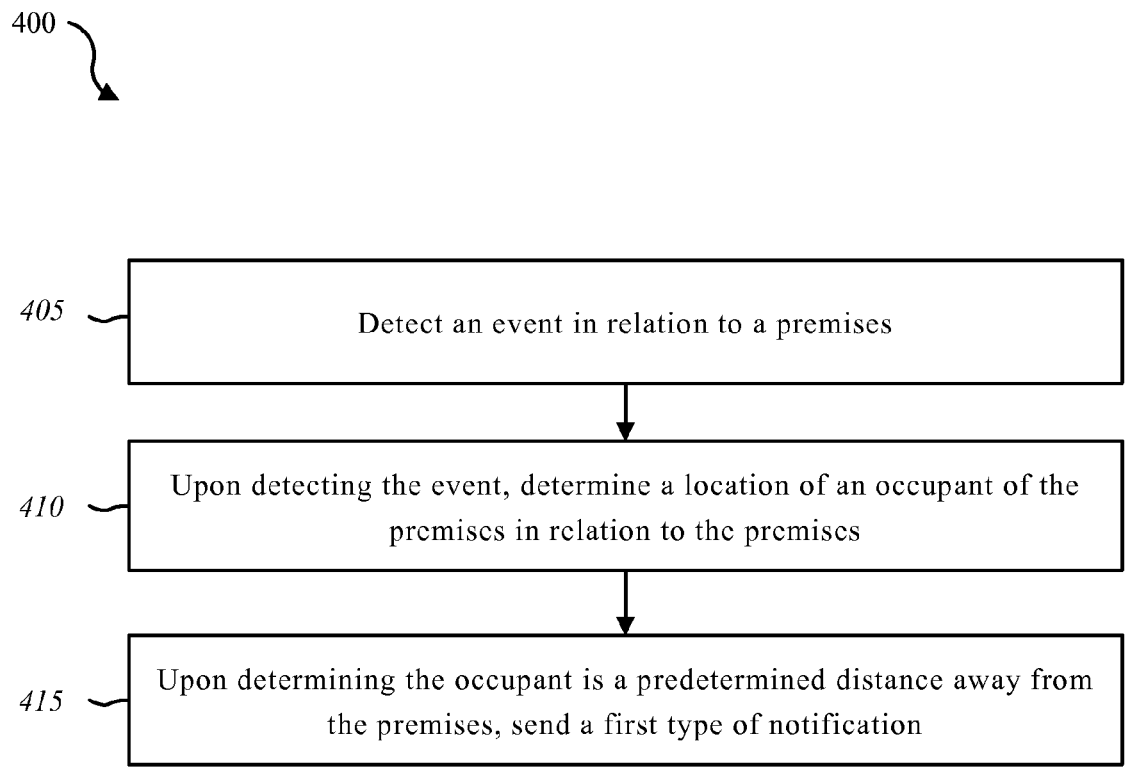
FIG. 4 is a flow diagram illustrating one embodiment of a method for remote presence security.

FIG. 4 is a flow diagram illustrating one embodiment of a method 400 for remote presence security. In some configurations, the method 400 may be implemented by the remote security module 130 illustrated in FIG. 1, 2, or 3. In some configurations, the method 400 may be implemented in conjunction with the application 155 illustrated in FIG. 1 and/or the user interface 245 illustrated in FIG. 1 or 2.

At block 405, an event may be detected in relation to a premises. At block 410, upon detecting the event, a location of an occupant of the premises may be determined in relation to the premises. At block 415, upon determining the occupant is a predetermined distance away from the premises, a first type of notification may be sent. The first type of notification may include a display of real-time video being captured at the premises.

Figure 5:
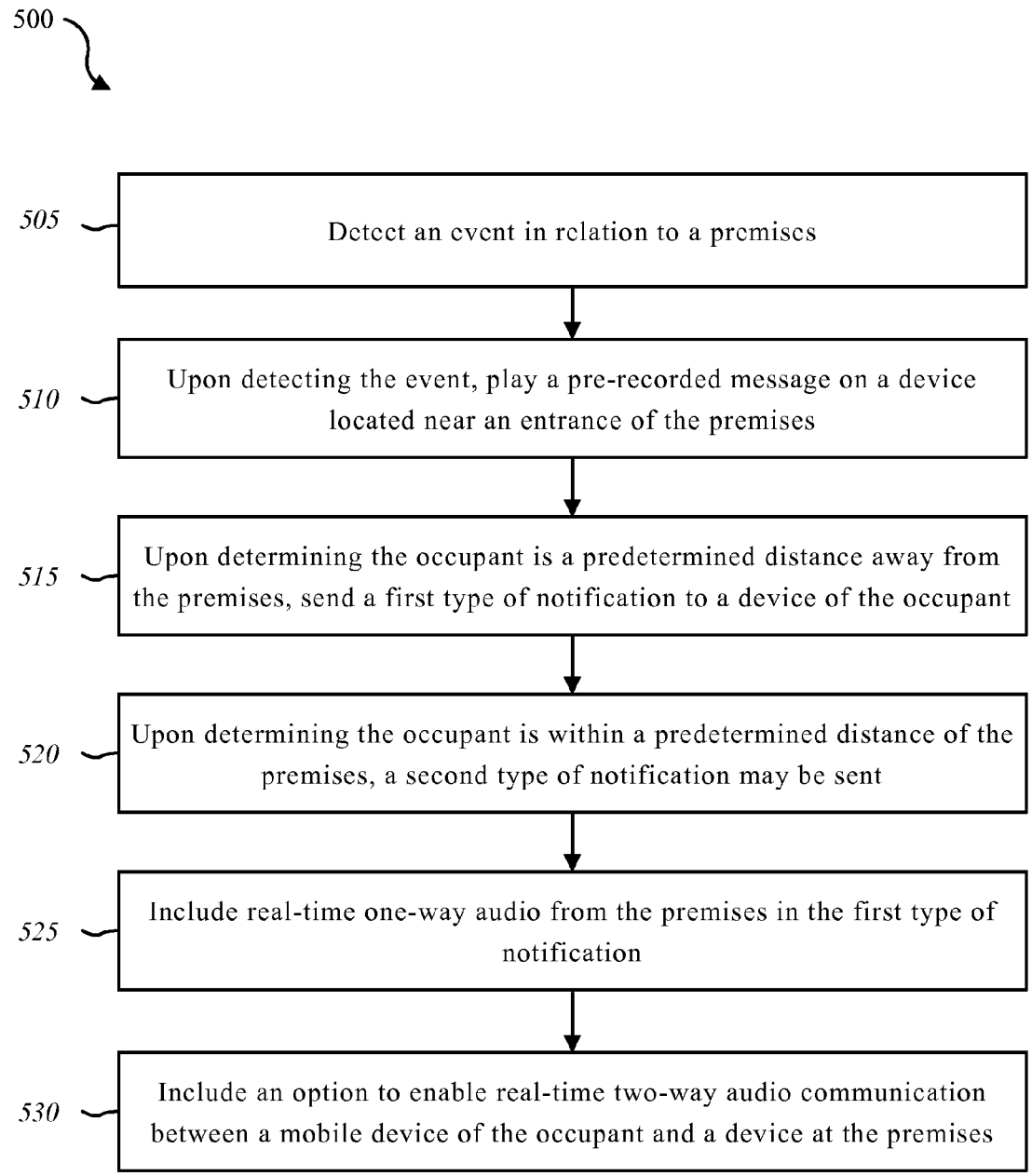
FIG. 5 is a flow diagram illustrating one embodiment of a method for responding to a detected event.

FIG. 5 is a flow diagram illustrating one embodiment of a method 500 for responding to a detected event. In some configurations, the method 500 may be implemented by the remote security module 130 illustrated in FIG. 1, 2, or 3. In some configurations, the method 500 may be implemented in conjunction with the application 155 illustrated in FIG. 1 and/or the user interface 245 illustrated in FIG. 1 or 2.

At block 505, an event may be detected in relation to a premises. At block 510, upon detecting the event, a prerecorded message may be played on a device located near an entrance of the premises. At block 515, upon determining the occupant is a predetermined distance away from the premises, a first type of notification may be generated and sent to a device of the occupant. At block 520, upon determining the occupant is within a predetermined distance of the premises, a second type of notification may be sent to the device of the occupant. The second type of notification may include one or more options to enable the occupant to select how to respond to the event. At block 525, real-time one-way audio from the premises may be included in the first notification. At block 530, an option to enable real-time two-way audio communication between a mobile device of the occupant and a device at the premises may be included in the first type of notification.

Figure 6:
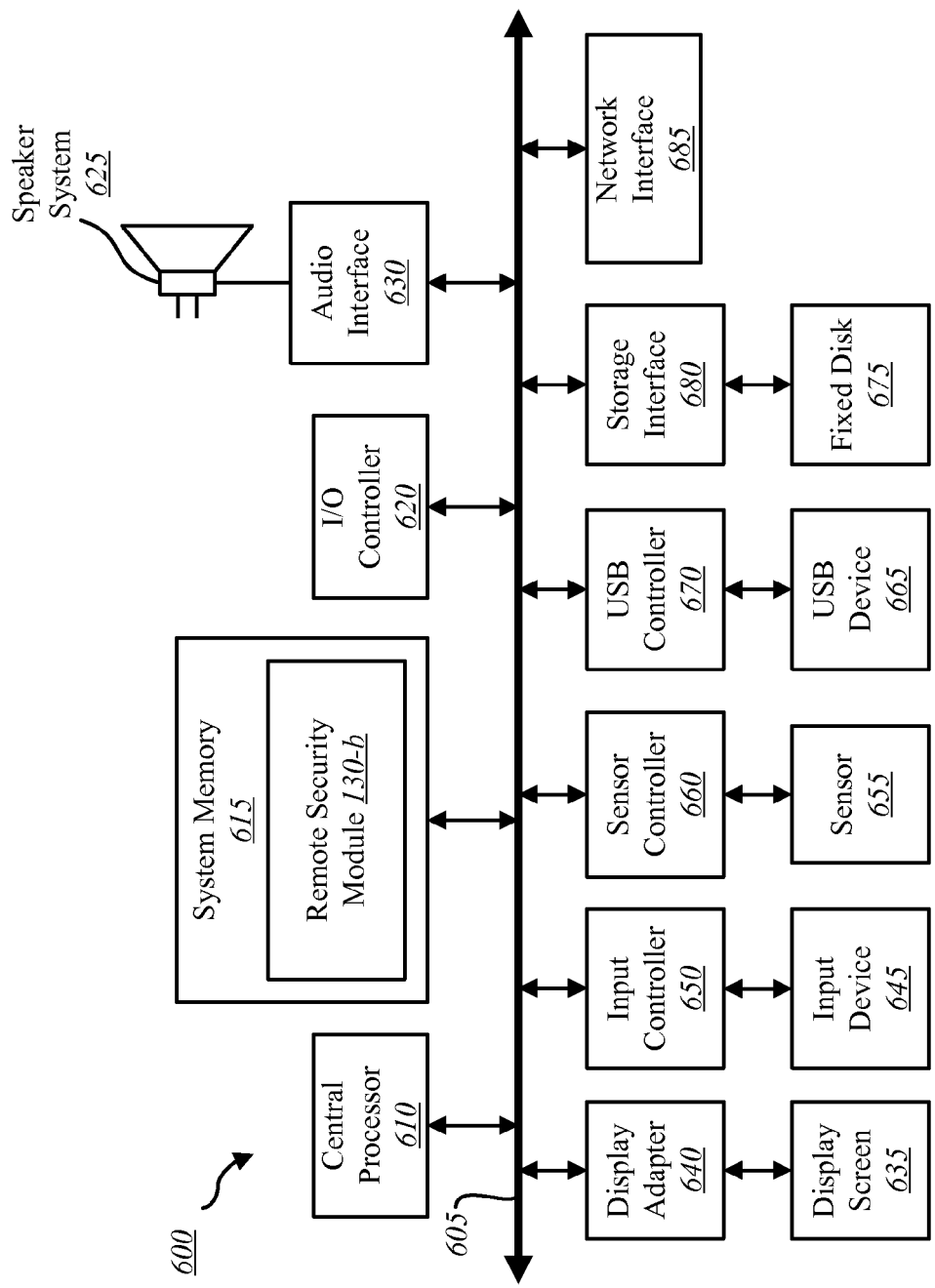
FIG. 6 depicts a block diagram of a computer system suitable for implementing the present systems and methods.

FIG. 6 depicts a block diagram of a controller 600 suitable for implementing the present systems and methods. The controller 600 may be an example of the set top box device 105, computing device 150, and/or home automation controller 155 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the voice installation module 145-b to implement the present systems and methods may be stored within the system memory 615. Applications resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for remote presence security, comprising:
   detecting an event in relation to a premises;
   upon detecting the event, determining a location of an occupant of the premises in relation to the premises;
   upon determining the occupant is a first predetermined distance away from the premises, sending a first type of notification, the first type of notification comprising a display of real-time video being captured at the premises; and
   upon determining the occupant is within a second predetermined distance of the premises, sending a second type of notification, the second type of notification comprising one or more options to enable the occupant to select how to respond to the event.

2. The method of claim 1, the first type of notification comprising an option to enable real-time two-way audio communication between a mobile device of the occupant and a device at the premises.

3. The method of claim 1, the first type of notification comprising real-time one-way audio from a device at the premises to a mobile device of the occupant.

4. The method of claim 1, further comprising:
   upon detecting the event, communicating pre-recorded data to a device associated with an entrance of the premises.

5. The method of claim 1, the one or more options comprising an option to send the real-time video being captured at the premises to a dedicated television channel accessed via a media delivery device.

6. The method of claim 1, the one or more options comprising an option to respond to the event using a control panel at the premises.

7. The method of claim 1, the one or more options comprising an option to respond to the event using a device on which the second type of notification was received.

8. The method of claim 1, the one or more options comprising an option to notify emergency personnel regarding the event.

9. The method of claim 1, the one or more options comprising an option to disregard the event.

10. A computing device configured for remote presence security, comprising:
    a processor;
    memory in electronic communication with the processor; and
    instructions stored in the memory, the instructions being executable by the processor to:
      detect an event in relation to a premises;
      upon detecting the event, determine a location of an occupant of the premises;
      upon determining the occupant is a first predetermined distance away from the premises, sending a first type of notification, the first type of notification comprising a display of real-time video being captured at the premises; and
      upon determining the occupant is within a second predetermined distance of the premises, send a second type of notification, the second type of notification comprising one or more options to enable the occupant to select how to respond to the event.

11. The computing device of claim 10, the first type of notification comprising an option to enable real-time two-way audio communication between a mobile device of the occupant and a device at the premises.

12. The computing device of claim 10, the first type of notification comprising real-time one-way audio from a device at the premises to a mobile device of the occupant.

13. The computing device of claim 10, wherein the instructions are executable by the processor to:
    upon detecting the event, communicate pre-recorded data to a device associated with an entrance of the premises.

14. The computing device of claim 10, the one or more options comprising an option to send the real-time video being captured at the premises to a dedicated television channel accessed via a media delivery device.

15. The computing device of claim 10, the one or more options comprising an option to respond to the event using a control panel at the premises.

16. The computing device of claim 10, the one or more options comprising an option to respond to the event using a device on which the second type of notification was received.

17. The computing device of claim 10, the one or more options comprising an option to notify emergency personnel regarding the event, and an option to disregard the event.

18. A computer-program product for enabling security, by a processor, via remote presence, the computer-program product comprising a non-transitory computer-readable medium storing instructions thereon, the instructions being executable by the processor to:
    detect an event in relation to a premises;
    upon detecting the event, determine a location of an occupant of the premises in relation to the premises;

upon determining the occupant is a first predetermined distance away from the premises, send a first type of notification, the first type of notification comprising a display of real-time video being captured at the premises; and upon determining the occupant is within a second predetermined distance of the premises, send a second type of notification, the second type of notification comprising one or more options to enable the occupant to select how to respond to the event.

* * * * *